(12) United States Patent  
Alavandi et al.

(10) Patent No.: US 8,991,903 B1
(45) Date of Patent: Mar. 31, 2015

(54) DEFLECTOR-CATCHER FOR SMALL OVERLAP VEHICLE IMPACTS

(71) Applicant: Ford Global Technologies, LLC, Dearborn, MI (US)

(72) Inventors: Bhimaraddi Venkaraddi Alavandi, Canton, MI (US); Morteza Tanbakuchi, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/045,823

(22) Filed: Oct. 4, 2013

(51) Int. Cl.
*B62D 25/08* (2006.01)
*B60R 19/34* (2006.01)
*B60R 19/54* (2006.01)

(52) U.S. Cl.
CPC ..................... *B60R 19/54* (2013.01)
USPC ............... 296/187.09; 296/187.1; 293/133; 293/154

(58) Field of Classification Search
CPC .. B60R 19/24; B60R 19/26; B60R 2019/242; B60R 2019/247; B60R 2021/0004; B60R 2021/0009; B60R 2021/0023; B60R 2021/0025
USPC .......... 296/187.09, 187.1; 293/102, 132, 133, 293/154, 155, 149, 150
See application file for complete search history.

(56) References Cited

U.S. PATENT DOCUMENTS

| 6,655,728 | B2 | 12/2003 | Sano et al. |
| 6,957,846 | B2 * | 10/2005 | Saeki .................... 296/187.1 |
| 7,243,981 | B2 | 7/2007 | Park et al. |
| 7,284,788 | B1 * | 10/2007 | Barbat et al. ............. 296/187.09 |
| 8,393,673 | B2 | 3/2013 | Terada et al. |
| 8,414,041 | B2 * | 4/2013 | Paare et al. .................... 293/154 |
| 8,454,080 | B2 * | 6/2013 | Qu et al. ..................... 296/187.1 |
| 8,485,592 | B2 * | 7/2013 | Shin et al. ................ 296/203.02 |
| 8,544,589 | B1 * | 10/2013 | Rupp et al. ..................... 180/274 |
| 8,608,231 | B1 * | 12/2013 | Mendivil et al. .......... 296/187.03 |
| 8,662,566 | B1 * | 3/2014 | Edwards et al. .......... 296/187.09 |
| 8,720,961 | B2 * | 5/2014 | Han .............................. 293/133 |
| 8,733,823 | B2 * | 5/2014 | Brockhoff et al. .......... 296/187.1 |
| 8,764,096 | B2 * | 7/2014 | Han et al. ....................... 296/133 |
| 8,789,877 | B2 * | 7/2014 | Ohnaka et al. ............ 296/193.09 |
| 8,807,632 | B2 * | 8/2014 | Ramoutar et al. ....... 296/187.09 |
| 2004/0195862 | A1 * | 10/2004 | Saeki ........................ 296/187.09 |
| 2012/0091742 | A1 * | 4/2012 | Paare et al. .................... 293/132 |
| 2013/0069377 | A1 * | 3/2013 | Qu et al. ........................ 293/133 |

(Continued)

FOREIGN PATENT DOCUMENTS

JP 2009137522 6/2009
JP 2009262660 11/2009

(Continued)

OTHER PUBLICATIONS

Physics in the Crumple Zone Demonstrate How Less Stiff Materials, Like Plastic, Can Help Prevent Injury and Save Lives, American Chemistry Council, 2010-2013, pp. 1-2.

*Primary Examiner* — Gregory Blankenship
(74) *Attorney, Agent, or Firm* — Raymond L. Coppiellie; Brooks Kushman P.C.

(57) ABSTRACT

A front-end assembly including a deflector and a catcher bracket. The V-shaped deflector is attached to a bumper of a vehicle, a rear leg of the deflector has a distal end disposed adjacent to the frame rail. In a collision, the distal end of the rear leg engages the catcher bracket to reduce intrusion into the passenger compartment of the vehicle.

15 Claims, 6 Drawing Sheets

(56) References Cited

U.S. PATENT DOCUMENTS

| | | | |
|---|---|---|---|
| 2013/0234456 A1* | 9/2013 | Brockhoff et al. | 293/133 |
| 2013/0249245 A1* | 9/2013 | Sekiguchi et al. | 296/187.09 |
| 2013/0328334 A1* | 12/2013 | Hoiss et al. | 293/154 |
| 2014/0008923 A1* | 1/2014 | Han et al. | 293/126 |
| 2014/0008924 A1* | 1/2014 | Han et al. | 293/133 |
| 2014/0062106 A1* | 3/2014 | Han | 293/133 |
| 2014/0091595 A1* | 4/2014 | Ramoutar et al. | 296/187.09 |
| 2014/0117717 A1* | 5/2014 | Parkila et al. | 296/187.09 |
| 2014/0159420 A1* | 6/2014 | Hashimoto et al. | 296/187.1 |
| 2014/0167450 A1* | 6/2014 | Sotoyama et al. | 296/187.09 |

FOREIGN PATENT DOCUMENTS

| | | |
|---|---|---|
| JP | 4794985 | 10/2011 |
| JP | 2012166744 | 9/2012 |

* cited by examiner

US 8,991,903 B1

DEFLECTOR-CATCHER FOR SMALL OVERLAP VEHICLE IMPACTS

TECHNICAL FIELD

This disclosure relates to an apparatus for reducing intrusions into the passenger compartment of a vehicle when subjected to small overlap impacts.

BACKGROUND

Land vehicles are tested for crashworthiness by a variety of tests including frontal impacts, side impacts, rear impacts, roll-over and other tests. Frontal impact tests were previously developed that specified that a vehicle impacts a barrier between the frame rails that extend longitudinally relative to the vehicle. In this type of test, the frame rails provided the primary support for the vehicle body. The extent of any intrusions into the passenger compartment are measured at the brake pedal, foot rest, left toe pan, center toe pan, right toe pan, left instrument panel, right instrument panel, and door.

A new test by IIHS is proposed for simulating small overlap frontal crashes against a rigid barrier. In the proposed test, the vehicle impacts a rigid barrier having a six inch pole-like radius on one corner with a 25% overlap at 40 MPH. The impact is outboard of the frame rails and the frame rails do not provide as much resistance to intrusion into the passenger compartment as in the case of impacts between the frame rails.

Deflectors that are attached to the outer end of a vehicle bumper have been tested and have reduced intrusions into the passenger compartment. However, additional reduction of intrusions in the small overlap rigid barrier test results are desired that are simple and cost effective.

This disclosure is directed to solving the above problems and other problems as summarized below.

SUMMARY

This disclosure relates to a deflector attached to a bumper of a vehicle that is stretched in a small overlap rigid barrier test and slides along a frame rail until the deflector contacts a catcher bracket attached to the frame rail.

According to one aspect of this disclosure, a front-end assembly is disclosed for a vehicle that reduces the potential for intrusions into the passenger compartment of the vehicle. The front-end assembly comprises a frame rail and a bumper disposed in front of the frame rail. A deflector, preferably V-shaped, is attached to the bumper and has a front leg extending outboard from the bumper. A rear leg extends from an outer end of the front leg toward the frame rail. A catcher bracket is attached to the frame rail behind the rear leg that inhibits the rear leg from sliding rearward in a collision.

According to another aspect of this disclosure, an apparatus is attached to a bumper and a frame rail of a vehicle for reducing intrusions into a passenger compartment. A deflector is attached to the bumper and has a first leg extending laterally outward from the bumper. A second leg extends inwardly from the first leg toward a location on the frame rail that is behind the bumper. A distal end of the second leg is adjacent to but not attached to the frame rail. A catcher bracket is attached to the frame rail in a spaced relationship rearward of the distal end of the second leg. The deflector is stretched and the distal end slides along the frame rail until the distal end engages the catcher bracket that restrains the distal end of the deflector.

According to a further aspect of this disclosure, an impact absorbing apparatus is disclosed for a front-end of a vehicle having a bumper and a frame rail. A deflector is attached to the bumper and includes an extension that extends laterally outboard of the bumper. A catcher bracket is attached to the frame rail at a location spaced from the extension. The force of an impact with an object that is longitudinally aligned with the extension is initially absorbed by stretching the extension to cause the extension to slide along the frame rail until the extension engages the catcher bracket.

A crush-can may be disposed between the frame rail and the bumper that absorbs energy from the collision and collapses toward the frame rail. The catcher bracket is attached to the frame rail in a spaced location to allow the rear leg of the V-shaped deflector to slide along the frame rail without impeding the crush-can from collapsing.

The catcher bracket may include a protrusion that extends laterally outboard from the frame rail. The catcher bracket may include at least one base wall that is attached to the frame rail. The protrusion may be a V-shaped portion of the catcher bracket that extends outwardly from the base wall. The base wall of the catcher bracket may include a front base wall and a rear base wall. The front base wall may be connected to a forward facing wall of the V-shaped portion. The rear base wall may be connected to a rear facing wall of the V-shaped portion. The rear leg of the V-shaped deflector may engage the front facing wall of the protrusion and the rear facing wall functions to support the front facing wall.

The above aspects and other aspects of this disclosure are described below in greater detail with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
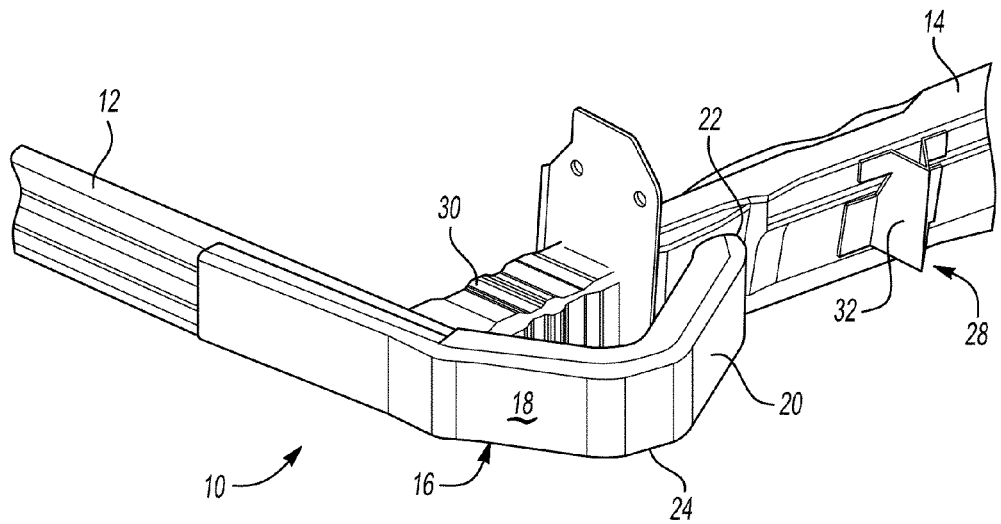
FIG. 1 is a fragmentary perspective view of a portion of a front-end of a vehicle including a deflector and a deflector catcher bracket according to one embodiment of this disclosure.

Referring to FIG. 1, a front-end assembly 10 is partially illustrated to show relevant portions of the structural parts that are intended to absorb a collision impact. The front-end assembly 10 includes a bumper 12 that is disposed in front of a frame rail 14 that extends longitudinally in the vehicle.

A V-shaped deflector 16, or extension, is shown attached to the bumper 12. The deflector 16 includes a front leg 18, or first leg, and a rear leg 20, or second leg. A distal end 22 of the rear leg 20 is shown disposed adjacent the frame rail 14, but is not permanently attached to the frame rail 14. The front leg 18 is connected to the rear leg 20 at an outer end 24 of the deflector 16.

A catcher bracket, generally indicated by reference numeral 28, is attached to the frame rail 14 in a spaced relationship relative to the distal end 22 of the rear leg 20. A crush-can 30 is shown assembled between the bumper 12 and frame rail 14. The spacing between the distal end 22 of the rear leg 20 and the catcher bracket 28 is comparable to the length of the crush-can 30. The crush-can 30 functions to absorb a collision impact without interference from deflector 16 or catcher bracket 28 because the distal end 22 of the rear leg 20 is spaced from the catcher bracket 28. The catcher bracket 28 includes a protrusion 32 that inhibits movement of the rear leg 20 in a collision and increases the extent of energy absorption achieved in a small overlap rigid barrier test. The structure of the catcher bracket 28 including the protrusion 32 is described below with reference to FIG. 2.

Figure 2:
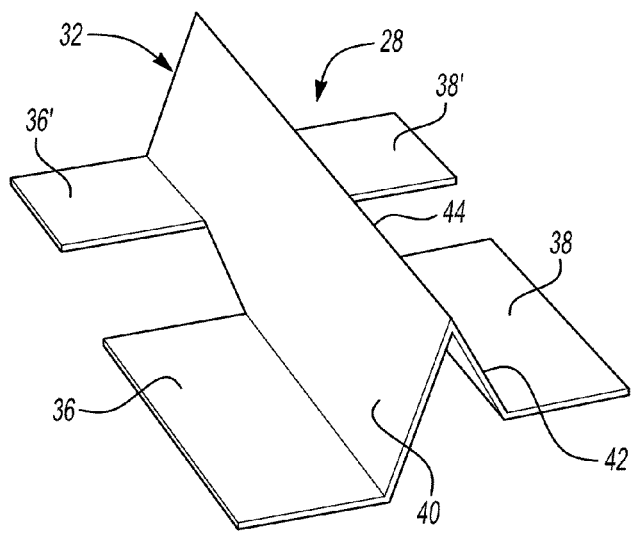
FIG. 2 is a perspective view of a catcher bracket shown in isolation.

Referring to FIG. 2, the catcher bracket 28 is illustrated in greater detail and is shown to include a front base wall 36 and a rear base wall 38 that are attached to the frame rail 14 by welding, fasteners or adhesives to provide a permanent connection between the walls 36, 38 and the frame rail 14. The front base wall 36, as shown in FIG. 2, also includes an upper portion 36' and the rear base wall 38 is shown with an upper base wall portion 38'. The upper portions 36' and 38' are separated from the front base wall portion 36 and rear base wall portion 38 to accommodate the configuration of the frame rail 14 where the catcher bracket 28 is attached. Other adaptations of the base walls may be required to accommodate packaging considerations and differences in the environment of the catcher bracket 28.

The protrusion is U-shaped and includes a forward facing wall 40 and a rear facing wall 42. The forward facing wall 40 and rear facing wall 42 are joined at an outer end 44.

Figure 3:
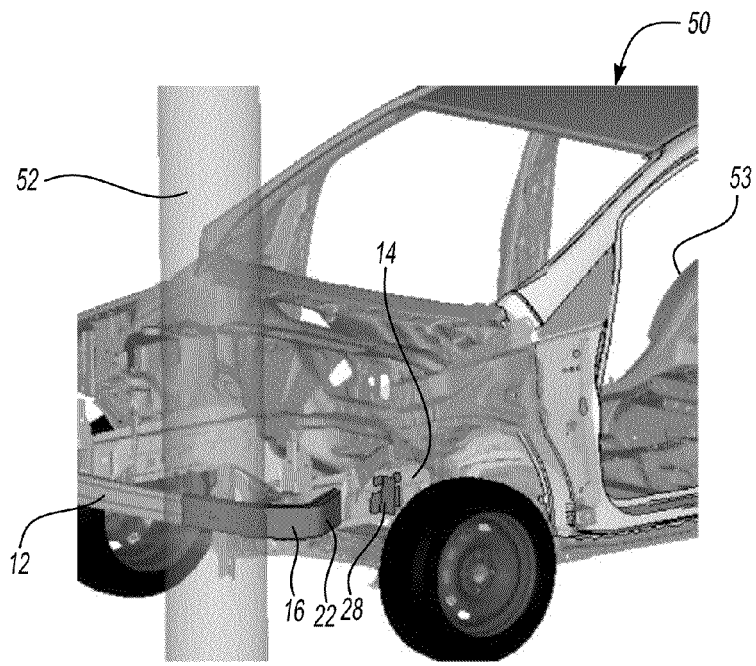
FIG. 3 is a graphic representation of a base vehicle prior to impact, in a simulated collision, with a rigid barrier in a small overlap rigid barrier test.

Referring to FIG. 3, a vehicle 50 is shown with the deflector 16 attached to one end of the bumper 12. The catcher bracket 28 is attached to the frame rail 14. The vehicle 50 is shown prior to impacting a rigid barrier 52 such as a pole.

Figure 4:
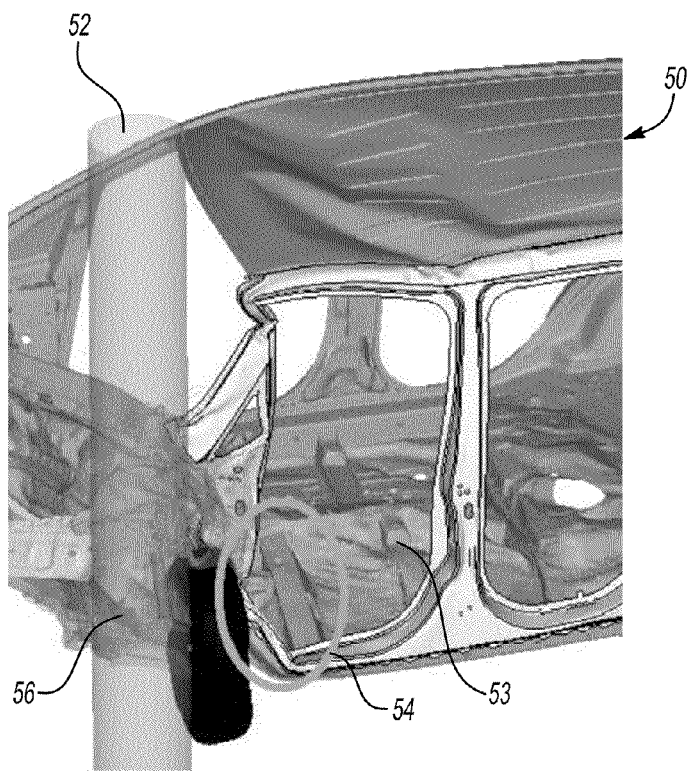
FIG. 4 is a graphic representation of a base vehicle post impact in a simulated collision with a rigid barrier in a small overlap rigid barrier test.

Referring to FIG. 4, a vehicle 50 that is a base vehicle not equipped with a deflector or catcher bracket is shown after colliding with a rigid barrier 52 in a small overlap rigid barrier (SORB) test that simulates a collision of a vehicle outboard of a frame rail with a simulated pole. Circle 50 highlights the body side frame and floor deformation that occurred in the simulation in the passenger compartment 53 of the vehicle 50.

Figure 5:
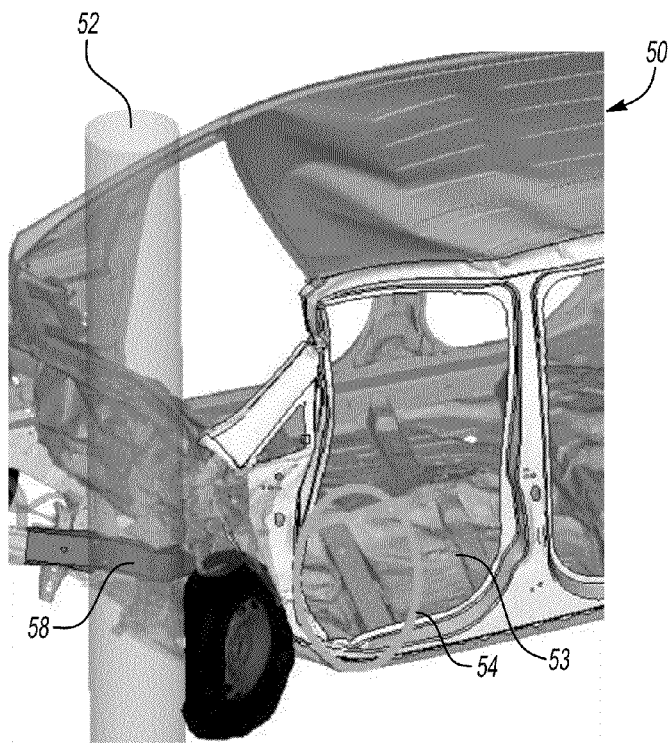
FIG. 5 is a graphic representation of a base vehicle post impact, with deflector alone, in a simulated collision with a rigid barrier in a small overlap rigid barrier test.

Referring to FIG. 5, the vehicle 50 provided with the U-shaped deflector 16 is shown after a simulated SORB test. The vehicle with the V-shaped deflector 16 is shown after a collision with the post-collision deflector 56 being stretched rearwardly. Referring to the circled area 54, the deflector used alone is shown to reduce passenger compartment 53, body side frame and door deformation to a limited extent.

Figure 6:
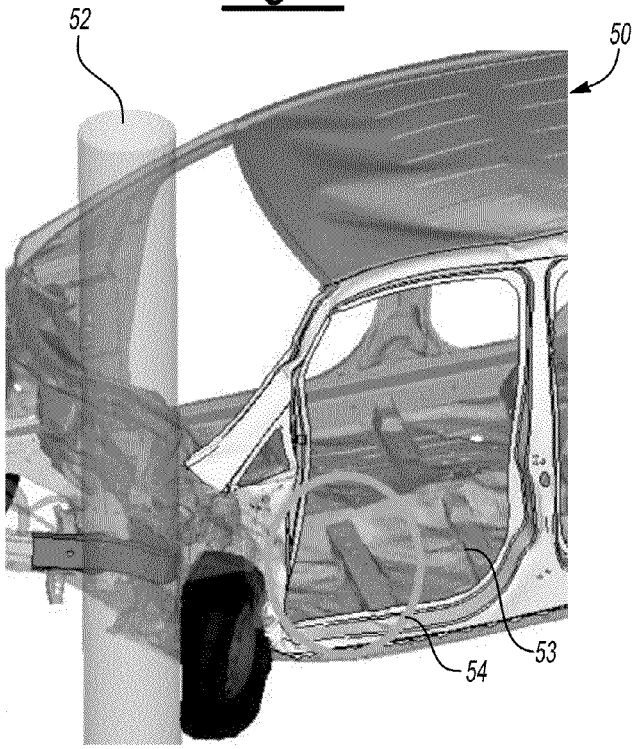
FIG. 6 is a graphic representation of a base vehicle post impact, with deflector and catcher, in a simulated collision with a rigid barrier in a small overlap rigid barrier test.

Referring to FIG. 6, the vehicle 50 is shown following a simulated SORB impact. In this view, the vehicle 50 includes both the deflector 16 and catcher bracket 28. The extent of body side frame and floor deformation is dramatically reduced. The post-collision deflector 58 used with the catcher bracket 28 shows that the rear leg 20 is bent back toward the front leg 18 and is restrained by the frame rail 14 when the deflector 16 is caught by the catcher bracket 28.

Figure 7:
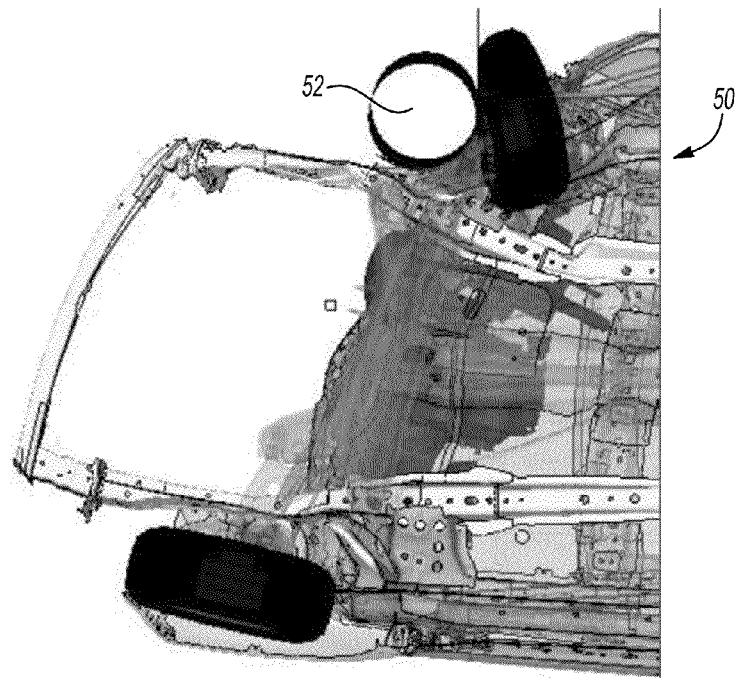
FIG. 7 is a bottom perspective view of a graphic representation of a base vehicle with a deflector in a simulated collision with a rigid barrier.

Referring to FIG. 7, the vehicle 50 is shown as a base vehicle that does not include the deflector 16 or catcher bracket 28. The vehicle 50 is shown from below after impacting the rigid barrier 52. In this simulation, the frame rail 14 is only minimally involved in absorbing the collision impact.

Figure 8:
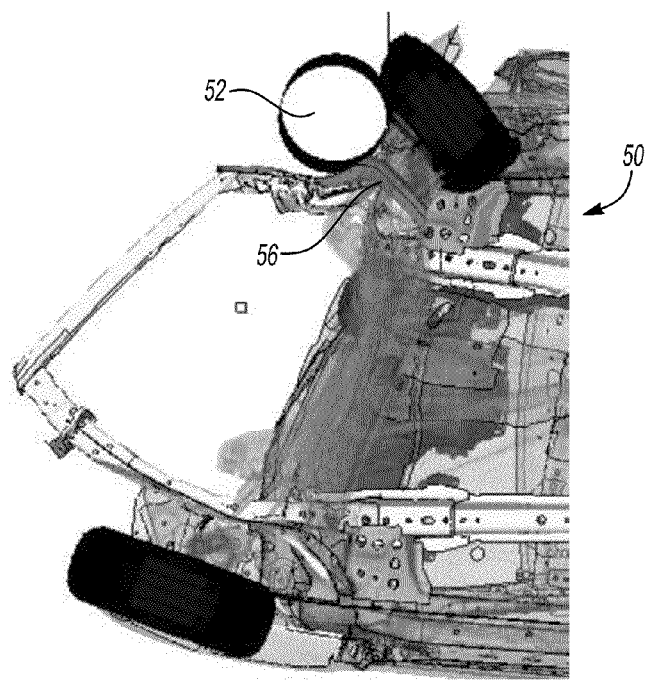
FIG. 8 is a bottom perspective view of a graphic representation of a base vehicle with deflector alone in a simulated collision with a rigid barrier.

Referring to FIG. 8, the vehicle 50 is shown after a simulated collision with a rigid barrier 52. The post-collision deflector 56 without a catcher bracket 28 is included on the vehicle 50. The post-collision deflector 56 engages the rail to a limited extent, but moves rearwardly after a limited degree of deformation.

Figure 9:
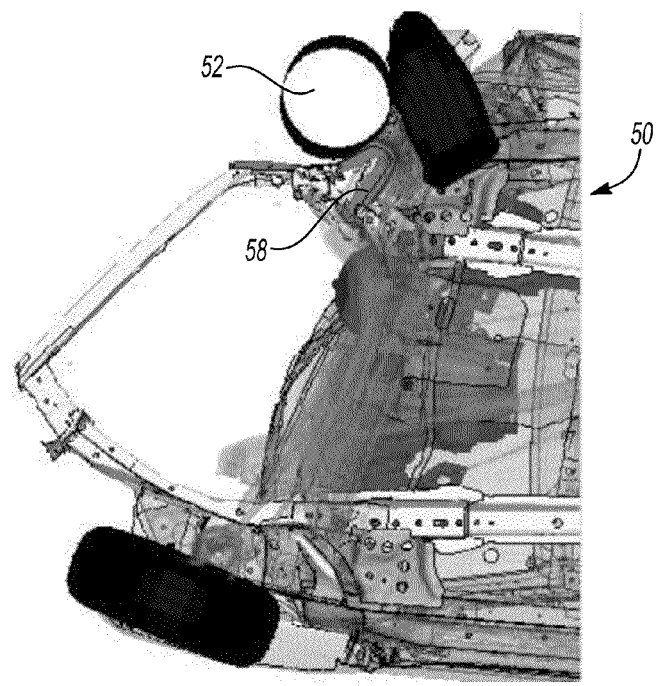
FIG. 9 is a bottom perspective view of a graphic representation of a base vehicle with deflector and catcher in a simulated collision with a rigid barrier.

Referring to FIG. 9, the vehicle is shown after a simulated collision with the rigid barrier 52. The post-collision deflector 58 when a deflector and catcher bracket are provided is illustrated in FIG. 9 to be deformed by being bent with the rear leg 20 being compressed toward the front leg 18 (shown in FIGS. 1 and 6). With the deflector 16 and catcher bracket 28, the deflector 16 transfers the collision impact force partially to the frame rail 14 and results in reduced intrusion into the passenger compartment 53. The use of the deflector 16 and catcher bracket 28 also facilitates rotation of the vehicle 50 away from the impact to further reduce intrusions into the passenger compartment 53.

Figure 10:
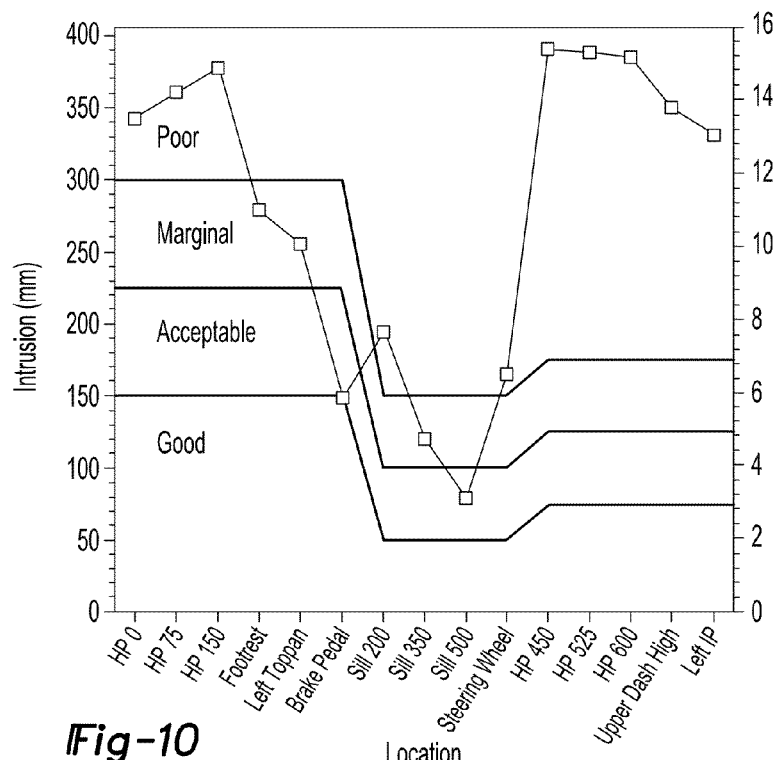
FIG. 10 is a graph showing the extent of intrusion into the passenger compartment of a vehicle at different locations in a vehicle monitored in a small overlap rigid barrier test for a base vehicle.

Referring to FIG. 10, a graph of intrusions into the passenger compartment of the vehicle as monitored in the SORB test is shown for the base vehicle and corresponds to FIGS. 4 and 7 that were previously described. The intrusion measurements for the base vehicle are generally in the poor range, particularly at the hinge pillar and at the upper dash high location and left instrument panel area.

Figure 11:
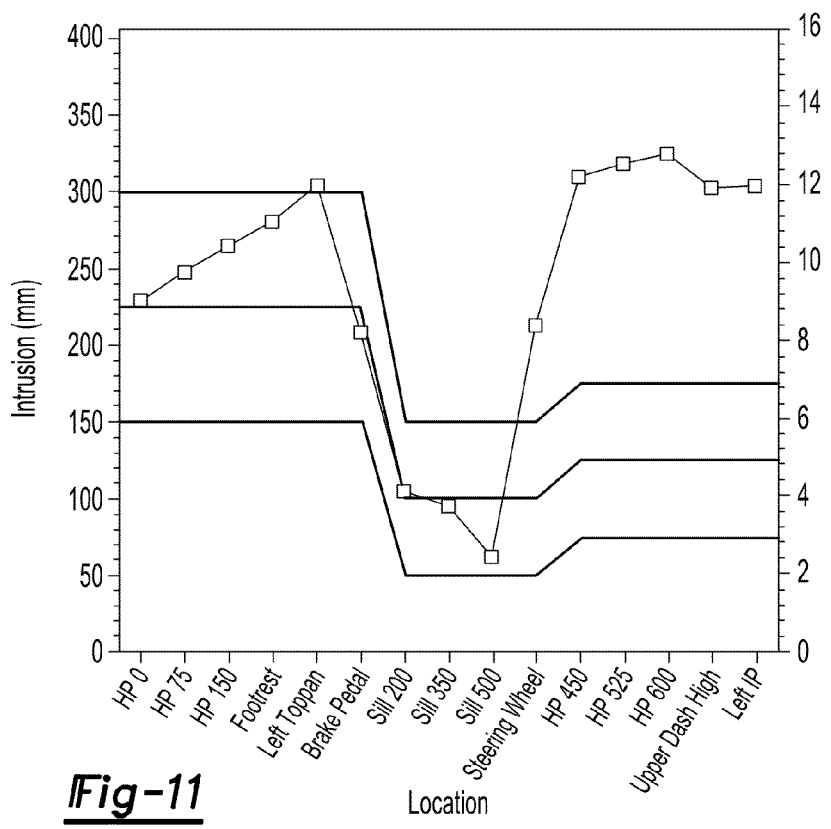
FIG. 11 is a graph showing the extent of intrusion into the passenger compartment of a vehicle at different locations in a vehicle monitored in a small overlap rigid barrier test for a vehicle with a deflector alone.

Referring to FIG. 11, a graph similar to FIG. 10 is provided that shows the extent of intrusion when the deflector is assembled to the bumper of the vehicle. In this case, the results monitored in the SORB test indicate that intrusions are graded in the poor range for the steering wheel, hinge pillar locations and upper dash and left instrument panel. However, a marked improvement is shown in the other areas of the passenger compartment 53.

Figure 12:
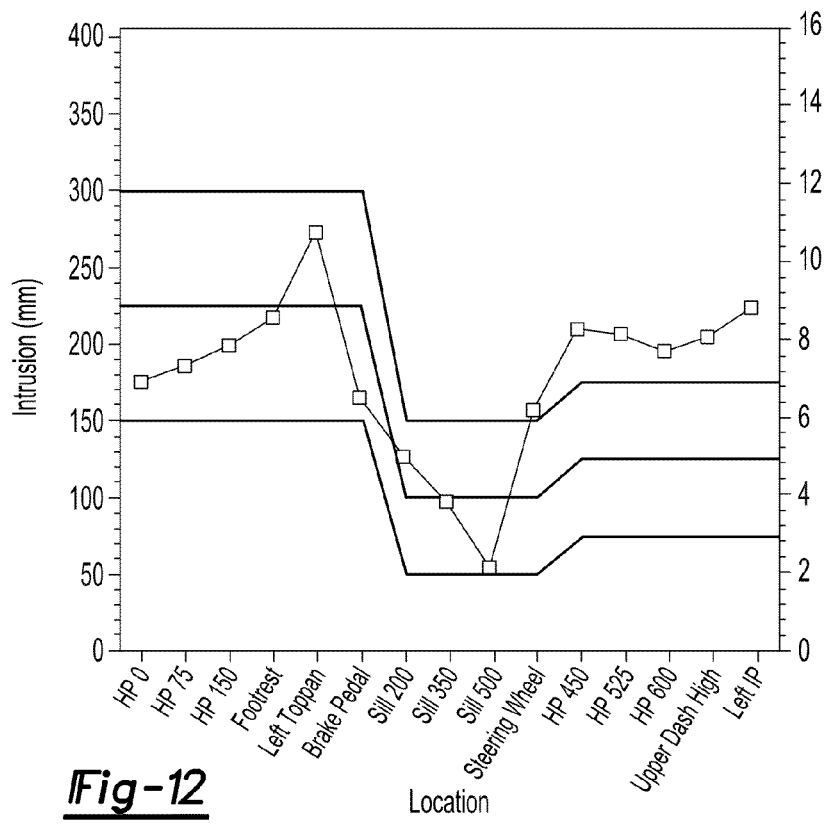
FIG. 12 is a graph showing the extent of intrusion into the passenger compartment of a vehicle at different locations in a vehicle monitored in a small overlap rigid barrier test for a vehicle with a deflector and catcher.

Referring to FIG. 12, a chart of intrusions is provided for of a vehicle including the deflector and the catcher bracket is provided. In this case, a substantial reduction of intrusions in the steering wheel, hinge pillar, upper dash and left instrument panel. Nearly all of the other intrusions monitored in the SORB test are in the acceptable or marginal range. A reduction of the extent of intrusions into the passenger compartment compared to the base vehicle measures approximately 150 mm. Compared to the deflector without a catcher bracket the extent of improvement is approximately 100 mm. This reduction in the extent of intrusion is a significant reduction and a considerable improvement meeting the requirements of the SORB test.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A front-end assembly for a vehicle comprising:
   a frame rail;
   a bumper disposed in front of the frame rail;
   a deflector having a front leg extending outboard from and attached to the bumper and a rear leg extending from an outer end of the front leg toward the frame rail; and
   a catcher bracket attached to the frame rail spaced behind the rear leg that slides along the frame rail until engaging the catcher bracket.

2. The front-end assembly of claim 1 further comprising:
   a crush-can disposed between the frame rail and the bumper absorbs energy from the collision and collapses toward the frame rail, wherein the catcher bracket is attached to the frame rail in a spaced location to allow the rear leg of the deflector to slide along the frame rail without impeding the crush-can from collapsing.

3. The front-end assembly of claim 1 wherein the catcher bracket includes a protrusion that extends laterally outboard from the frame rail.

4. The front-end assembly of claim 3 wherein the catcher bracket includes at least one base wall that is attached to the frame rail, and wherein the protrusion is a V-shaped portion of the catcher bracket that extends outwardly from the at least one base wall.

5. The front-end assembly of claim 4 wherein the at least one base wall of the catcher bracket includes a front base wall and a rear base wall, wherein the front base wall is connected to a forward facing wall of the V-shaped portion and the rear base wall is connected to a rear facing wall of the V-shaped portion, and wherein the rear leg of the deflector engages the front facing wall of the protrusion and the rear facing wall supports the front facing wall.

6. An apparatus attached to a bumper and a frame rail of a vehicle for reducing intrusions into a passenger compartment comprising:
   a deflector attached to the bumper and that has a first leg extending laterally outward from the bumper and a second leg that extends inwardly from the first leg toward a location on the frame rail that is behind the bumper, wherein a distal end of the second leg is adjacent to and not attached to the frame rail; and
   a catcher bracket attached to the frame rail in a spaced relationship rearward of the distal end of the second leg, wherein the deflector is stretched and the distal end slides along the frame rail until the distal end engages the catcher bracket that restrains the distal end of the deflector.

7. The apparatus of claim 6 further comprising:
   a crush-can disposed between the frame rail and the bumper absorbs energy from a collision and collapses toward the frame rail, wherein the catcher bracket is attached to the frame rail at a location spaced from the distal end of the deflector to allow the second leg of the deflector to slide along the frame rail without impeding the crush-can from collapsing.

8. The apparatus of claim 6 wherein the catcher bracket includes a protrusion that extends laterally outboard from the frame rail.

9. The apparatus of claim 8 wherein the catcher bracket includes at least one base wall that is attached to the frame rail, and wherein the protrusion is a V-shaped portion of the catcher bracket that extends outwardly from the at least one base wall.

10. The apparatus of claim 9 wherein the at least one base wall of the catcher bracket includes a front base wall and a rear base wall, wherein the front base wall is connected to a forward facing wall of the V-shaped portion and the rear base wall is connected to a rear facing wall of the V-shaped portion, and wherein the second leg of the deflector engages the front facing wall of the protrusion and the rear facing wall supports an outer end of the front facing wall.

11. An impact absorbing apparatus for a front-end of a vehicle having a bumper and a frame rail, the comprising:
    a deflector attached to the bumper and including an extension extending laterally outboard of the bumper; and
    a catcher bracket attached to the frame rail at a location spaced from the extension, wherein a force of an impact with an object that is longitudinally aligned with the extension is initially absorbed by stretching the extension to cause the extension to slide along the frame rail until the extension engages the catcher bracket.

12. The apparatus of claim 11 further comprising:
    a crush-can disposed between the frame rail and the bumper absorbs energy from the impact and collapses toward the frame rail, wherein the catcher bracket is attached to the frame rail at a location spaced from the deflector to allow a rear leg of the deflector to slide along the frame rail without impeding the crush-can from collapsing.

13. The apparatus of claim 11 wherein the catcher bracket includes a protrusion that extends laterally outboard from the frame rail.

14. The apparatus of claim 13 wherein the catcher bracket includes at least one base wall that is attached to the frame rail, and wherein the protrusion is a V-shaped portion of the catcher bracket that extends outwardly from the at least one base wall.

15. The apparatus of claim 14 wherein the at least one base wall of the catcher bracket includes a front base wall and a rear base wall, wherein the front base wall is connected to a forward facing wall of the V-shaped portion and the rear base wall is connected to a rear facing wall of the V-shaped portion, and wherein a rear leg of the deflector engages the front facing wall of the protrusion and the rear facing wall supports an outer end of the front facing wall.

* * * * *